United States Patent
Du

(10) Patent No.: US 11,295,381 B2
(45) Date of Patent: Apr. 5, 2022

(54) DATA AUDITING METHOD AND DEVICE

(71) Applicant: Advanced New Technologies Co., Ltd., Grand Cayman (KY)

(72) Inventor: Huabing Du, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 176 days.

(21) Appl. No.: 16/811,863

(22) Filed: Mar. 6, 2020

(65) Prior Publication Data
US 2020/0211105 A1 Jul. 2, 2020

Related U.S. Application Data

(63) Continuation of application No. PCT/CN2018/116838, filed on Nov. 22, 2018.

(30) Foreign Application Priority Data

Dec. 29, 2017 (CN) .......................... 201711480640.7

(51) Int. Cl.
*G06Q 40/02* (2012.01)
*G06Q 40/04* (2012.01)
(Continued)

(52) U.S. Cl.
CPC .......... *G06Q 40/025* (2013.01); *G06Q 40/04* (2013.01); *H04L 9/14* (2013.01); *H04L 9/3239* (2013.01); *H04L 63/0428* (2013.01)

(58) Field of Classification Search
None
See application file for complete search history.

(56) References Cited

U.S. PATENT DOCUMENTS 5,892,900 A * 4/1999 Ginter .................. G06Q 20/12
726/26
6,658,568 B1 * 12/2003 Ginter .................. G06Q 20/12
705/51
(Continued)

FOREIGN PATENT DOCUMENTS

CN 103795696 5/2014
CN 105721158 6/2016
(Continued)

OTHER PUBLICATIONS

L. Tajan, D. Westhoff, C. A. Reuter and F. Armknecht, "Private information retrieval and Searchable Encryption for privacy-preserving multi-client cloud auditing," 2016 11th(ICITST, 2016, pp. 162-169, doi: 10.1109/ICITST.2016.7856690. (Year: 2016).*

(Continued)

*Primary Examiner* — Jacob C. Coppola
*Assistant Examiner* — Eduardo Castilho
(74) *Attorney, Agent, or Firm* — Fish & Richardson P.C.

(57) ABSTRACT

Implementations of the present specification provide data auditing for a secure multi-party computation. In an implementation, a search result is determined based on a secure computation of a plurality of computing nodes, wherein the secure computation comprises generating encrypted data to determine the search result. An auditing request with respect to the search result is received. Keys used by the plurality of computing nodes are retrieved for the secure computation. To-be-audited data is retrieved from one or more of the plurality of computing nodes in a trusted storage space. The encrypted data is decrypted using on the keys to determine original data of respective computing nodes of the plurality of computing nodes. Each computing node of the plurality of computing nodes is audited based on the original data.

20 Claims, 4 Drawing Sheets

(51) Int. Cl.
*H04L 9/14* (2006.01)
*H04L 9/32* (2006.01)
*H04L 29/06* (2006.01)

(56) References Cited

U.S. PATENT DOCUMENTS

| | | | | |
|---|---|---|---|---|
| 10,503,730 | B1* | 12/2019 | Speers | G06F 16/2365 |
| 10,664,538 | B1* | 5/2020 | Pallemulle | G06F 21/84 |
| 2006/0212698 | A1* | 9/2006 | Peckover | G06F 21/10 |
| | | | | 713/151 |
| 2010/0142704 | A1* | 6/2010 | Camenisch | H04L 9/3013 |
| | | | | 380/44 |
| 2011/0078175 | A1* | 3/2011 | Rashad | G06F 16/2465 |
| | | | | 707/769 |
| 2015/0332283 | A1* | 11/2015 | Witchey | G06Q 30/018 |
| | | | | 705/3 |
| 2016/0162897 | A1* | 6/2016 | Feeney | G06Q 20/065 |
| | | | | 705/71 |
| 2017/0103228 | A1* | 4/2017 | Yavuz | G06F 21/606 |
| 2017/0155515 | A1* | 6/2017 | Androulaki | G06Q 20/065 |
| 2017/0250972 | A1* | 8/2017 | Ronda | H04L 9/3236 |
| 2017/0264428 | A1* | 9/2017 | Seger, II | G06F 16/13 |
| 2018/0060596 | A1* | 3/2018 | Hamel | G06F 21/62 |
| 2018/0181768 | A1* | 6/2018 | Leporini | G06F 21/31 |
| 2018/0260888 | A1* | 9/2018 | Paolini-Subramanya | |
| | | | | G06Q 20/4016 |
| 2018/0349617 | A1* | 12/2018 | Wang | G06F 21/64 |
| 2019/0020480 | A1* | 1/2019 | Camenisch | H04L 9/3263 |
| 2019/0122296 | A1 | 4/2019 | Ying | |
| 2019/0188702 | A1* | 6/2019 | Bolla | G06Q 20/3829 |

FOREIGN PATENT DOCUMENTS

| | | |
|---|---|---|
| CN | 105812126 | 7/2016 |
| CN | 106230808 | 12/2016 |
| CN | 106503994 | 3/2017 |
| CN | 106682530 | 5/2017 |
| CN | 106936818 | 7/2017 |
| CN | 107103252 | 8/2017 |
| CN | 107483446 | 12/2017 |
| CN | 108364223 | 8/2018 |
| TW | 201643765 | 12/2016 |
| WO | WO 2017193108 | 11/2017 |

OTHER PUBLICATIONS

S. Alansari, F. Paci, A. Margheri and V. Sassone, "Privacy-Preserving Access Control in Cloud Federations," 2017 IEEE 10th International Conference on Cloud Computing (CLOUD), 2017, pp. 757-760, doi: 10.1109/CLOUD.2017.108. (Year: 2017).*

M. Jemel and A. Serhrouchni, "Decentralized Access Control Mechanism with Temporal Dimension Based on Blockchain," 2017 IEEE 14th International Conference on e-Business Engineering (ICEBE), 2017, pp. 177-182, doi: 10.1109/ICEBE.2017.35. (Year: 2017).*

Hossein Shafagh, Lukas Burkhalter, Anwar Hithnawi, Simon Duquennoy—Towards Blockchain-based Auditable Storage and Sharing of IoT Data arXiv:1705.08230v2 [cs.DC] (Year: 2017).*

Agniva Banerjee, Karuna Pande Joshi Link Before You Share: Managing Privacy Policies through Blockchain arXiv:1710.05363v1 [cs.CR] (Year: 2017).*

A. Y. Sarhan and S. Carr, "A Highly-Secure Self-Protection Data Scheme in Clouds Using Active Data Bundles and Agent-Based Secure Multi-party Computation," 2017 IEEE 4th International Conference on Cyber Security and Cloud Computing (CSCloud), 2017, pp. 228-236, doi: 10.1109/CSCloud.2017.36. (Year: 2017).*

Crosby et al., "BlockChain Technology: Beyond Bitcoin," Sutardja Center for Entrepreneurship & Technology Technical Report, Oct. 16, 2015, 35 pages.

International Search Report and Written Opinion in PCT Appln. No. PCT/CN2018/116838, dated Feb. 26, 2019, 10 pages (with partial English translation).

Nakamoto, "Bitcoin: A Peer-to-Peer Electronic Cash System," www.bitcoin.org, 2005, 9 pages.

Extended European Search Report in EP Appln. No. 18894484.7, dated Jun. 3, 2020, 5 pages.

International Preliminary Report on Patentability in PCT Appln. No. PCT/CN2018/116838, dated Jun. 30, 2020, 11 pages.

* cited by examiner

DATA AUDITING METHOD AND DEVICE

CROSS-REFERENCE TO RELATED APPLICATIONS

This application is a continuation of PCT Application No. PCT/CN2018/116838, filed on Nov. 22, 2018, which claims priority to Chinese Patent Application No. 201711480640.7, filed on Dec. 29, 2017, and each application is hereby incorporated by reference in its entirety.

TECHNICAL FIELD

The present disclosure relates to the field of information technology, and in particular, to a method and an apparatus for data auditing.

BACKGROUND

As a supervision mechanism, auditing plays an important role in modern society. At present, with the development of the Internet, more types of contents are being audited, for example, auditing a user's insurances at insurance companies, auditing a user's loans, and auditing a user's assets. A service provider can, based on audit results, determine whether to provide services to a user or what services to provide.

Since the market is open, there may be a plurality of service providers in the market for the same service. For the same transaction, a user can perform a transaction at a plurality of service providers that provide such transaction, so that the respective service providers perform the same type of transaction for the same user, that is, a multi-source transaction.

Loan transaction is taken as an example for illustration below. In the existing technology, when a loan provided by a single lender cannot meet a user's needs, the user can further submit loan requests to more lenders to obtain more loans, that is, a multi-source lending.

Since there is an upper limit to the repayment ability of a user, too much loans offered to the same user may result in bad debts. Thus, any lender that provides a loan transaction, in order to reduce the risk of the loan transaction, can determine the total amount of loans that the user has obtained from other lenders before approving the transaction, and then determine whether to provide the loan transaction.

For example, assuming that user a needs a loan of 1 million yuan. Since the loan obtained by user a from bank b (assumed to be 300 thousand yuan) does not suffice the demand from user a, user a can continue to initiate loan requests to bank c and bank d. Then, bank c and bank d may first determine the total amount of loans obtained by user a from other banks to determine whether to offer loan to user a.

However, since the amount of loan obtained by a user from a lender is private data to the lender, the lender usually does not want to reveal the amount of loan obtained by a user to a third party (e.g., other users or other lenders). By using the existing secure multi-party computation methods, the total amount of loans of a user from the respective lenders can be determined without revealing the privacy data of the respective lenders. However, since only encrypted data are adopted when performing secure multi-party computation, it is difficult to audit the respective lenders.

Based on existing technology, the present specification provides a new method and apparatus for data auditing.

SUMMARY

The implementations of the present specification provide a method and an apparatus for data auditing, which are used to alleviate the problem that, since in existing multi-source transactions a user's service data at respective computing nodes are private data to the respective computing nodes, it is difficult to audit multi-source transactions.

The implementations of the present specification adopt the following technical solutions.

A method for data auditing, includes: receiving an auditing request with respect to a search result; for each computing node, obtaining a key used by the computing node when generating encrypted data to obtain the search result, and obtaining to-be-audited data stored by the computing node in a trusted storage space; where the to-be-audited data stored by the computing node in the trusted storage space includes: encrypted data received by the computing node from other computing nodes, and/or encrypted data generated by the computing node; decrypting, based on the obtained keys of the respective computing nodes, the encrypted data in the to-be-audited data to obtain original data of the respective computing nodes; and auditing each computing node based on the obtained original data.

A method for data auditing includes: Receiving, by a computing node, an auditing request with respect to a search result from an agent; and returning to the agent the key used when generating the encrypted data to obtain the search result, so that the agent can decrypt, based on the key, the encrypted data generated by the computing node among the to-be-audited data obtained from the trusted storage space, to determine the original data of the computing node, and audit the computing node based on the determined original data.

An apparatus for data auditing, includes: a receiving module, configured to receive an auditing request with respect to a search result; an obtaining module, configured to obtain, for each computing node, a key used by the computing node when generating encrypted data to obtain the search result, and obtain to-be-audited data stored by the computing node in a trusted storage space; where the to-be-audited data stored by the computing node in the trusted storage space includes: encrypted data received by the computing node from other computing nodes, and/or encrypted data generated by the computing node; a decrypting module, configured to decrypt the encrypted data in the to-be-audited data based on the obtained keys of the respective computing nodes, to obtain original data of the respective computing nodes; and an auditing module, configured to audit the respective computing nodes based on the obtained original data.

An apparatus for data auditing, includes: a receiving module, configured to receive an auditing request with respect to a search result from an agent; and a sending module, configured to return to the agent the key used when generating the encrypted data to obtain the search result, so that the agent can decrypt, based on the key, the encrypted data generated by the apparatus for data auditing among the to-be-audited data obtained from the trusted storage space, to determine the original data of the apparatus for data auditing, and audit the apparatus for data auditing based on the determined original data.

An agent device, includes one or more processors and memories storing a program, wherein the one or more processor are configured to perform steps of: receiving an auditing request with respect to a search result; for each computing node, obtaining a key used by the computing node when generating encrypted data to obtain the search result, and obtaining to-be-audited data stored by the computing node in a trusted storage space; where the to-be-audited data stored by the computing node in the trusted storage space includes: encrypted data received by the computing node from other computing nodes, and/or encrypted data generated by the computing node; decrypting the encrypted data in the to-be-audited data based on the obtained keys of the respective computing nodes, to obtain original data of the respective computing nodes; and auditing each computing node based on the obtained original data.

A computing node, includes one or more processors and memories storing a program, wherein the one or more processors are configured to perform steps of: receiving an auditing request with respect to a search result from an agent by the computing node; and returning to the agent the key used when generating the encrypted data to obtain the search result, so that the agent can decrypt, based on the key, the encrypted data generated by the computing node among the to-be-audited data obtained from the trusted storage space, to determine the original data of the computing node, and audit the computing node based on the determined original data.

The at least one technical solution described above adopted in the example implementations of the present specification can achieve the following beneficial effects.

By using the method and apparatus provided in the present specification, for each computing node, the to-be-audited data stored by the computing node in a trusted storage space includes encrypted data received by the computing node from other computing nodes, and/or encrypted data generated by the computing node. When the agent receives an auditing request with respect to the search result, for each computing node, a key used by the computing node when generating encrypted data to obtain the search result is obtained, and the to-be-audited data stored by the computing node are obtained from a trusted storage space. The agent can, based on the obtained keys of the respective computing nodes, decrypt the encrypted data included in the to-be-audited data obtained from the trusted storage space, to obtain original data of the respective computing nodes, and audit the respective computing nodes based on the obtained original data. Since the data to be audited and stored as evidence is encrypted data, the leakage of the privacy data of each computing node is avoided. At the same time, being stored in a trusted storage space reduces the possibility of the to-be-audited data being tampered with. Therefore, by using the method and apparatus provided in the present specification, the respective computing nodes performing a multi-source transaction can be audited, which provides a better basis for the development of multi-source transactions.

BRIEF DESCRIPTION OF THE DRAWINGS

The drawings described here are used to provide a further understanding of the present specification and constitute a part of the present disclosure. The schematic implementations of the present disclosure and the description thereof are used to explain the present disclosure, and do not constitute an improper limitation on the present disclosure. Among the drawings.

DETAILED DESCRIPTION OF THE IMPLEMENTATIONS

Figure 1:
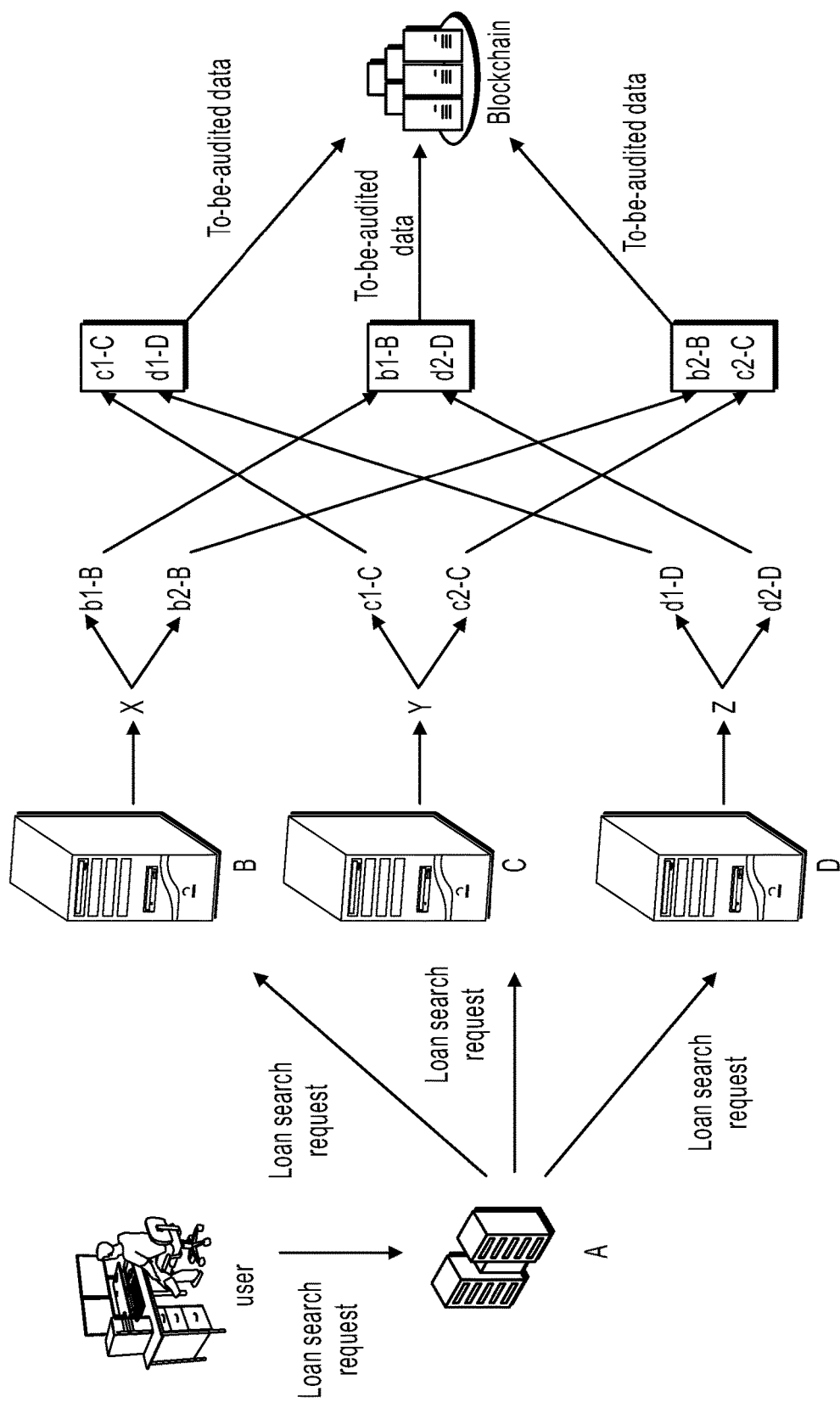
FIG. 1 is a schematic diagram of lenders sending encrypted data and storing to-be-audited data.

In the auditing process provided in the present specification, the targets to be audited are the respective computing parties performing a secure multi-party computation. The auditing process can be performed based on a received auditing request with respect to a search result, where the search result can be determined based on the secure multi-party computation.

In an existing method for secure multi-party computation, the respective computing parties participating in the computation can send to other computation parties the respective encrypted data obtained by encrypting the original data. Similarly, for each computation party, the computation party can further receive encrypted data sent by other computation parties, and any of the computation parties can, after a secure multi-party computation, obtain comprehensive data corresponding to the original data of the respective computation parties while not being able to restore the original data of the other computation parties. In order to audit the respective computation parties in a secure multi-party computation, during the process of the secure multi-party computation, the respective computing parties can determine the to-be-audited data and store them in a trusted storage space.

Generally, existing secure multi-party computations mainly adopt a secure multi-party algorithm based on Oblivious Transfer (OT) and a secure multi-party algorithm based on Secret Sharing (SS). Since there are differences between the computation processes of the two algorithms, and the determined to-be-audited data are not exactly the same, for convenience of description, computation using the secure multi-party algorithm based on Oblivious Transfer (OT) is taken as an implementation in the present specification.

Take multi-source lending scenario as an example for illustration. The respective computation parties can be the respective lenders, and for each lender, the original data determined by the lender can be the amount of a user's loan from the lender.

In the multi-source lending scenario in the present specification, the user can initiate a loan search request for the total amount of his loan, or the lender can initiate a loan search request for the total amount of the user's loan. In the case where the user initiates a loan search request, the loan search request can be received by an agent and sent to the respective lenders.

For each lender, the lender can first determine original data (that is, the amount of the user's loan at the lender) based on the loan search request, encrypt the original data based on a predetermined key pair to generate respective encrypted data corresponding to the original data, and then send the generated respective encrypted data to the other lenders. The key used by the lender for encryption can be determined based on the adopted secure multi-party algorithm (for example, in the OT-based secure multi-party algorithm, the key can be determined based on the RSA algorithm). In addition, the respective encrypted data generated by the lender based on the original data can be different, so the encrypted data sent to each of the other lenders can be different.

After receiving the encrypted data sent by the other lenders, the lender can further perform a secure multi-party computation based on the original data determined by itself and the received encrypted data, to obtain the search result of the search request (for example, in a multi-source lending scenario, the total amount of the user' loan can be computed), and then return the search result to the user.

In order to facilitate the subsequent auditing of the search result, the lender can store the encrypted data received from the other lenders as to-be-audited-data into a trusted storage space. The trusted storage space can be a blockchain or a trusted database. The trusted database can be the database of the lender or a third-party database. When the trusted storage space is a blockchain, the encrypted data stored by the lender can be prevented from being tampered with.

Since the encrypted data stored in the trusted storage space are encrypted data generated by the other lenders, in order to determine which lender certain encrypted data are generated by more easily, each lender can send to the other lenders, along with the encrypted data, the lender's own identifier and the corresponding relationship between the identifier and the encrypted data, as shown in FIG. 1.

FIG. 1 is a schematic diagram of the respective lenders sending the determined encrypted data after receiving loan search requests. It can be seen that agent A sends loan search requests to lenders B to D, and then each lender determines a plurality of encrypted data respectively. For example, lender B determines original data X based on the loan search request, and encrypts X to generate encrypted data b1, encrypted data b2, and so on. In addition, when sending the respective encrypted data, the respective lenders can also send the corresponding relationship between its own identifier and the encrypted data to the other lenders. For example, lender B sends encrypted data b1+B, representing encrypted data b1 corresponds to identifier B, and so on. Thus, each lender can receive encrypted data sent by the other lenders and store it as to-be-audited data into a blockchain. For example, lender B stores received c1+C and d1+D as to-be-audited data into the blockchain. The to-be-audited data stored in the blockchain contain identifiers of the lenders corresponding to the encrypted data.

Furthermore, for each lender, the lender can receive loan search requests targeted at different users, so in order to distinguish encrypted data determined based on different loan search requests, the lender can also send, along with the determined respective encrypted data, serial numbers of the loan search requests to the other lenders.

In continuation with the above example, assuming that agent A determines that the serial number of the loan search request is 001, then taking lender B as an example, the encrypted data sent by lender B to lender C can be b1+B+001 to indicate that encrypted data b1 is generated by lender B based on a loan search request of the serial number 001. Thus, when the agent determines the search result of a loan search request, the serial number can be further used as the serial number of the search result to indicate which search request the search result was obtained based on.

In addition, when the auditing request is initiated by the user through an agent, the respective lenders can also return the storing addresses of the to-be-audited data in the trusted storage space to the agent, so that the agent establishes and stores the corresponding relationship between serial numbers of loan search requests (or search results) and storage addresses, and the to-be-audited data can be obtained based on the respective storing addresses during subsequent audits.

It should be noted that, in addition to the above-mentioned OT-based secure multi-party algorithm, an SS-based secure multi-party algorithm can also be adopted. In the computation process of the SS-based secure multi-party algorithm, in addition to encrypted data sent by the other lenders being to-be-audited data, each lender can also take the encrypted data generated by itself as to-be-audited data, and store the to-be-audited data in a trusted storage space. Thus, in the storage process shown in FIG. 1, each lender can store the encrypted data generated by itself and the received encrypted data as the to-be-audited data into the blockchain.

When using the SS algorithm, for each lender, the lender can encrypt the original data as follows: receiving a search request, then encrypting the original data corresponding to the search request to obtain some encrypted data, determining part of the encrypted data as to-be-distributed encrypted data, sending each piece of the to-be-distributed encrypted data to the other lenders respectively, processing part or all of the unsent encrypted data among the number of encrypted data and the received encrypted data sent by the other lenders, and finally sending the results of processing to an agent so that the agent performs statistical calculation based on the result of processing sent by the lender and the results of processing sent by the other lenders, to determine the search result.

In addition, after the lenders respectively encrypt the original data, for any of the participating parties, only when encrypted data of a number no less than threshold value k are obtained, the original data can be restored, and when encrypted data of a number less than threshold value k are obtained, the original data cannot be restored. For example, assuming the lender uses the SS algorithm in the form of a polynomial, the polynomial is as follows:

$$F(X)=(A_0+A_1X+A_2X^2+\ldots+A_{k-1}X^{k-1}) \bmod q$$

$A_0$ in the polynomial represents the original data, that is, data that needs to be encrypted. $A_1$ to $A_{k-1}$ are the coefficients of the formula, which can be determined based on actual needs. q represents a divisor, which can also be determined based on actual needs. K is the threshold value mentioned above. In this polynomial, when X takes different values, different F(X) can be obtained. Different F(X) indicate different encrypted data.

When a lender determines the to-be-distributed encrypted data, the lender can select encrypted data of a number less than k from the number of encrypted data determined as the to-be-distributed encrypted data, and send the respective to-be-distributed encrypted data to the other lenders. For example, the lender can determine, by using the determined formula, F(1) to F(11) sequentially, where F(1) to F(11) are 11 pieces of encrypted data to be sent to the other lenders 1 to 11 sequentially.

Further, for each lender, when sending the to-be-distributed encrypted data to the other lenders, the lender also receives encrypted data sent and determined, based on search requests, by other lenders. In this way, the lender can process part or all of the unsent encrypted data among some encrypted data generated by itself and the received encrypted data sent by the other lenders, and obtain corresponding results of processing.

The lender can adopt a summation algorithm when processing the encrypted data, in which the lender adds up part or all of the unsent encrypted data among some encrypted data generated by itself and the received encrypted data sent by the other lenders, and sends the sum to the agent.

Finally, the agent can receive the results of processing of the respective lenders, and use the Lagrangian difference formula in the SS algorithm to determine the total amount of the user's loans at the respective lenders as the search result. Since it is the sums obtained through statistical processing that are sent to the agent by the respective lenders, therefore, the agent cannot determine, respectively and through the obtained sums, the original data corresponding to the search requests stored by the respective lenders, but can only perform data statistical calculation through the respective sums.

Figure 2:
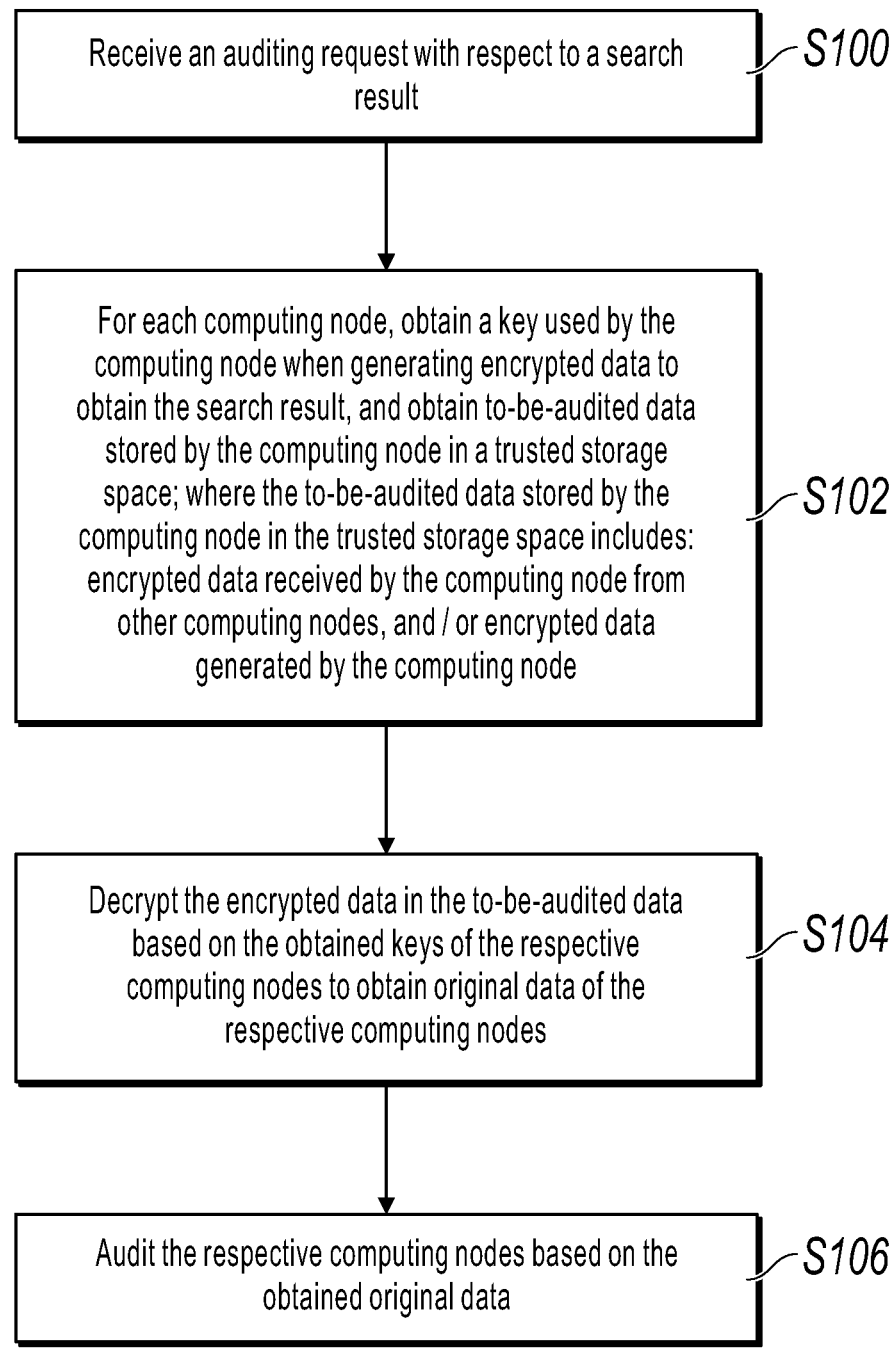
FIG. 2 is a process for data auditing, according to an implementation of the present specification.

Based on the above-mentioned process of secure multi-party computation, the respective computing parties store the to-be-audited data in a trusted storage space, so that an auditing process as shown in FIG. 2 can be performed on the respective computing parties subsequently.

In order to make the purpose, the technical solution, and the advantages of the present specification clearer, the technical solution of the present disclosure will be described clearly and comprehensively with reference to specific implementations of the present specification and corresponding drawings. Obviously, the described implementations are only a part, but not all, of the implementations of the present disclosure. Based on the implementations in the specification, all other implementations obtained by a person of ordinary skill in the art without creative efforts shall fall within the scope of protection of the present disclosure.

The technical solutions provided by the implementations of the present disclosure will be described in detail below with reference to the accompanying drawings.

FIG. 2 is a process for data auditing provided by an implementation of the specification, including the following steps.

S100: an auditing request with respect to a search result is received.

In one or more implementations of the present specification, the process for data auditing can be applied to a multi-source business scenario for auditing a plurality of service providers. For example, assuming that user a applies for insurance at insurance company e, insurance company e can send search requests to other insurance companies to determine the total amount insured by user a at the respective insurance companies through secure multi-party computation. When user a has questions about the total amount insured by user a obtained at insurance company e, user a can initiate an auditing request with respect to the search result through the agent, thereby auditing the data that is under a secure multi-party computation. Of course, if insurance company e has questions about the total amount insured, insurance company e can also initiate an auditing request with respect to the search result. In the present specification, it is not limited by which party the auditing request is initiated, nor is it limited what kind of service the multi-source transaction is specifically.

For convenience of description, a multi-source lending is taken below as the service scenario of the data auditing process provided by the present specification, in which the agent sends auditing requests to the respective lenders based on an auditing request initiated by the user. The search request can be a loan search request. The computing nodes are participants who perform the secure multi-party computation, and can be lenders providing loan transactions. The agent is an execution body that receives the auditing request and executes the auditing process. The agent may be a software server, integrated on a device of a third party that has no interest with the respective lenders, or on a device of one of the lenders, which is not limited in the present specification.

In addition, since the auditing requests in the present specification are targeted at search results, before the agent receives the auditing request, each lender should also receive the search request, perform a secure multi-party computation based on the search request, and determine the search result. For details, refer to the previous described description regarding secure multi-party computations.

At S102, for each computing node, a key used by the computing node when generating encrypted data to obtain the search result is obtained, and to-be-audited data stored by the computing node in a trusted storage space is obtained; where the to-be-audited data stored by the computing node in the trusted storage space includes: encrypted data received by the computing node from other computing nodes, and/or encrypted data generated by the computing node.

In the implementations of the present specification, assume the respective lenders (that is, the respective computing nodes) as described in step S100 have stored the to-be-audited data in a trusted storage space as evidence when performing the search service based on the loan search request. Therefore, for each lender, the agent can obtain from the lender the key used by the lender to generate encrypted data to obtain the search result, and obtain from the trusted storage space the to-be-audited data stored by the lender for subsequent steps.

Specifically, the auditing request in the present specification can carry a serial number of the search result. The serial number of the search result can be the serial number of the loan search request initiated to obtain the search result. If the agent has stored the corresponding relationship between serial numbers and storage addresses, the agent can determine the storage addresses of the to-be-audited data stored in the trusted storage space by the respective lenders, and then obtain the respective to-be-audited data from the trusted storage space. If the process of performing the service based on the loan search request is performed by the respective lenders without the agent's participation, and the agent has not stored the corresponding relationship between serial numbers and storage addresses, then the agent can send the auditing request to the respective lenders, so that each lender can, based on the auditing request, determine the storage address of the to-be-audited data in the trusted storage space corresponding to the serial number of the search result, and obtain from the trusted storage space, based on the determined storage address, the to-be-audited data so as to return to the agent. Alternatively, upon receiving the auditing request, each lender can also return to the agent the storage address of the to-be-audited data in the trusted storage space determined based on the serial number of the search result. The agent can obtain, from the trusted storage space, the respective to-be-audited data based on the storage addresses returned by the respective lenders.

In addition, since keys are private to the respective lenders, it is necessary for the agent to send auditing requests to the respective lenders, and the respective lenders, provide to the agent, the keys the lenders used when generating encrypted data to obtain the search result.

It should be noted that, for each lender, if in step S100, the lender performs an OT-based secure multi-party computation, and the lender stores in the trusted storage space encrypted data sent by other lenders as to-be-audited data, then the encrypted data generated by the lender are not among the to-be-audited data stored by the lender and obtained by the agent. If in step S100, the lender performs an SS-based secure multi-party computation, and the lender stores in the trusted storage space encrypted data generated, based on the loan search request, by the lender itself and encrypted data sent by other lenders as to-be-audited data, then the encrypted data generated by the lender are among the to-be-audited data stored by the lender and obtained by the agent.

At S104, the encrypted data in the to-be-audited data is decrypted based on the obtained keys of the respective computing nodes, to obtain original data of the respective computing nodes.

In the implementations of the present specification, contained in the to-be-audited data are encrypted data obtained by encrypting the original data by each lender, so by decrypting the to-be-audited data based on the obtained keys, the original data of the respective lenders can be obtained.

Specifically, for the to-be-audited data stored by each lender in the trusted storage space, the to-be-audited data contain encrypted data generated by different lenders and identifiers of the respective lenders corresponding to the respective encrypted data. The identifier of the lender corresponding to the encrypted data is the identifier of the lender who generated the encrypted data. Thus, after obtaining the respective to-be-audited data stored by the respective lenders in the trusted storage space, the agent can determine the encrypted data generated by each lender based on the identifier corresponding to the encrypted data.

In addition, for each lender, the respective encrypted data obtained by the lender after the encryption of the original data are different, so the agent can obtain all the encrypted data of the lender and then decrypt, based on the key of the lender, the respective encrypted data generated by the lender, so as to obtain the original data of the lender. Of course, depending on different secure multi-party algorithms adopted, the agent can also obtain encrypted data of the lender of a number greater than a threshold value, and then decrypt, based on the key of the lender, the respective encrypted data generated by the lender, so as to obtain the original data of the lender, which is not limited in the present specification.

At S106, the respective computing nodes are audited based on the obtained original data.

In the present specification, after determining the original data of the respective lenders, the agent can audit the respective lenders based on the obtained original data of the respective lenders. For example, the agent can audit whether the original data of the respective lenders are real, so as to determine whether the respective lenders have tampered with the data when performing, based on the loan search request, secure multi-party computations. Of course, in the present specification, it is not limited in which manner the respective lenders are audited.

In addition, in the present specification, for each lender, if, when performing the search service based on the search request, the lender tampers with the original data required for secure multi-party computation (for example, tampering with the determined amount of a user's loan from the lender), then the to-be-audited data to be stored as evidence will be data obtained through the lender's encryption of the tampered data. Therefore, the agent cannot determine, through the original data obtained in step S104, whether the lender has tampered with the original data.

It should be noted that the original data described in this specification are the data the respective lenders encrypt when performing secure multi-party computations, rather than the real data stored by the lenders.

For example, a bank determines that the original data are "100 thousand yuan". Suppose that the bank changes the original data to "1 million yuan" when performing a secure multi-party computation, encrypts the tampered original data, and sends the encrypted data to other participants in the secure multi-party computation. Then the original data of the bank obtained through decryption by the agent in step S104 is "1 million yuan". However, the real data stored by the bank are still "100 thousand yuan".

Thus, in step S106 of the present disclosure, the agent can also obtain the electronic documents of the respective lenders when performing loan transactions, and audit, based on the amounts of loans recorded in the electronic documents, the original data determined by the respective lenders based on the search requests. Of course, the agent can also audit the respective lenders manually.

For example, in continuation with the above example, assuming further that when a user requests a loan from a bank, the electronic document the bank generates corresponding to the amount of the user's loan based on the loan transaction is: "300 thousand yuan". The agent can also obtain the electronic document stored by the bank, and audit the bank based on the electronic document and the determined original data of the bank.

Based on the data auditing process shown in FIG. 2, contained in the to-be-audited data which a computing nodes stores are encrypted data generated by other computing nodes and/or encrypted data generated by the computing node itself, which, on the one hand, reduces the incentive for the computing node to tamper with the to-be-audited data, and on the other hand, makes it possible to directly determine the problematic computing node, since the agent will not be able to obtain the original data through decryption during the subsequent auditing process if the computing node has tampered with the encrypted data which the computing node itself stored as evidence. In addition, since the keys are stored as privacy data by the respective computing nodes, it is impossible to restore the original data by a third party even if the third party obtains the encrypted data generated by a computing node. It can be seen that by using the method provided in the present specification, the encrypted data are stored as evidence while secure multi-party computations are performed, which makes it possible to audit the respective computing nodes and provides a better basis for the development of multi-source transactions.

In addition, since the agent can, in step S102, obtain the keys provided by each lender based on the auditing requests, in order to prevent the privacy data of the lender from being revealed to others, the agent can also determine, before sending the auditing request to each lender, whether the user has permission to view private data. Similarly, upon receiving an auditing request, each lender can also determine whether the agent and/or the user who initiated the audit have permission to obtain private data.

Specifically, the agent can first obtain the identity information of the user to determine, based on the identity information, whether the user has permission to initiate an audit. If so, send the auditing requests, and if not, do not send the auditing requests. Alternatively, the agent carries the user's identity information in the auditing requests and sends them to the respective lenders, and the respective lenders return the keys when the lenders determine that the user has permission to audit. In an example of the present specification, since the party initiating an audit can view the original data during the audit, a user can be determined to have permission to initiate an audit when the user is determined to have permission to view or obtain privacy data.

For example, the agent can determine whether the auditing request initiated by the user is targeted at his or her own loan, and if so, the user is determined to have permission to initiate an audit. Or, when a lender receives an auditing request, determine whether the agent is authorized by the user and so on. Of course, other methods can also be adopted, and the present specification does not impose a limit on how to determine whether the user and/or agent who initiated an audit has permission to initiate the audit.

Further, in the above implementations of the present specification, the data auditing process applied in a multi-source lending scenario is taken as an example for illustration. Of course, the method for data auditing can also be applied in other service scenarios.

For example, in the scenario where a user's insurance situation is to be audited, the search request can be an insurance search request, the determined search result can be the total amount insured by the user at the respective insurance service providers, and the respective computing nodes can be devices of the respective insurance service providers. In the scenario where a user's assets are to be audited, the search request can be an asset search request, the determined search result can be the user's total investment, and the respective computing nodes can be devices of institutions such as banks, insurance companies and real estate transaction centers or devices of corporations. This specification does not limit in which service scenarios the method for data auditing is applied.

It should be noted that the execution body of all steps of the method provided in the implementations of the present specification can be the same device, or the method can also use different devices as execution bodies. For example, the execution body of steps S100 and S102 can be device 1, and the execution body of step S102 can be device 2; or alternatively, the execution body of step S100 can be device 1, and the execution body of steps S102 and S104 can be device 2. Described above are some specific implementations of the present specification. All other implementations are within the scope of the appended claims. In some cases, actions or steps described in the claims can be performed in a different order than in the implementations and desired results can still be achieved. In addition, the processes depicted in the drawing do not necessarily require the particular order shown or a sequential order to achieve the desired results. In certain implementations, multitasking processing and parallel processing can be feasible or advantageous.

Figure 3:
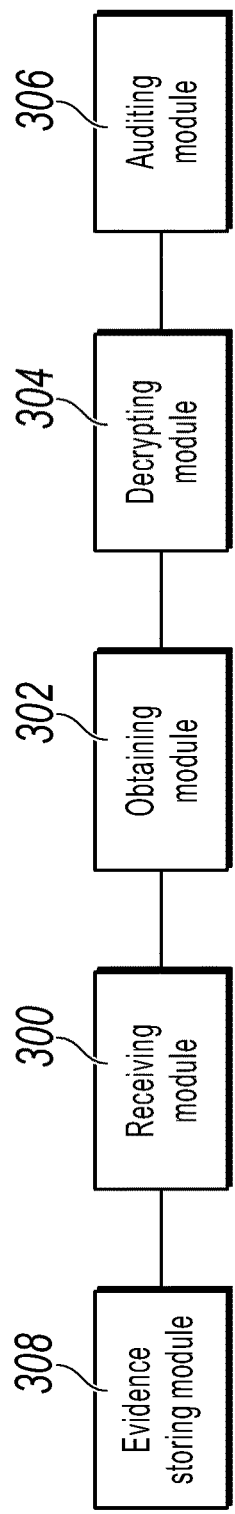
FIG. 3 is a structural diagram illustrating an apparatus for data auditing, according to an implementation of the present specification.

Based on the method for data auditing shown in FIG. 2, implementations of the present specification further provide an apparatus for data auditing, as shown in FIG. 3.

FIG. 3 is a structural diagram of an apparatus for data auditing provided by an implementation of the specification, including: a receiving module 300, configured to receive an auditing request with respect to a search result; an obtaining module 302, configured to obtain, for each computing node, a key used by the computing node when generating encrypted data to obtain the search result, and obtain to-be-audited data stored by the computing node in a trusted storage space; where the to-be-audited data stored by the computing node in the trusted storage space includes: encrypted data received by the computing node from other computing nodes, and/or encrypted data generated by the computing node; a decrypting module 304, configured to decrypt the encrypted data in the to-be-audited data based on the obtained keys of the respective computing nodes, to obtain original data of the respective computing nodes; and an auditing module 306, configured to audit the respective computing nodes based on the obtained original data.

For each computing node, the encrypted data generated by the computing node is obtained by encrypting the original data determined to obtain the search result; the original data is determined, after a search request to obtain the search result is received, by the computing node based on the search request; and the encrypted data generated by the computing node is sent to other computing nodes for secure multi-party computation.

The apparatus further includes: an evidence storing module 308, configured to receive a storage address corresponding to the serial number of the search result returned by the computing node, establish and store a corresponding relationship between the storage address and the serial number.

The auditing request carries the serial number of the search result, and the obtaining module 302 is configured to determine the storage address corresponding to the serial number carried in the auditing request based on the corresponding relationship between stored serial numbers and storage addresses, and obtain the to-be-audited data from the trusted storage space according to the determined storage address.

The to-be-audited data further includes an identifier of a computing node corresponding to the encrypted data, where the identifier of the computing node corresponding to the encrypted data is the identifier of the computing node that generated the encrypted data; and the obtaining module 302 is configured to, for each computing node, determine, based on the identifier of the computing node, the encrypted data generated by the computing node from the obtained to-be-audited data; and decrypt, based on the key of the computing node, the determined encrypted data.

The trusted storage space includes at least: a blockchain.

Figure 4:
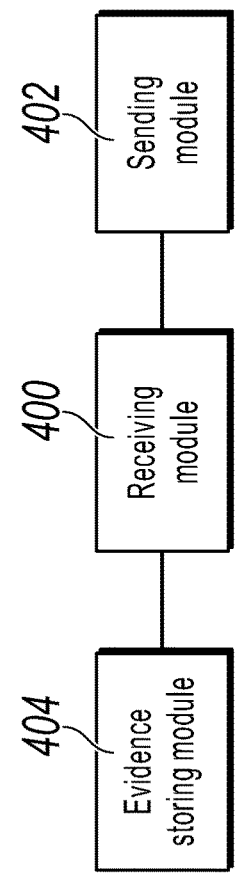
FIG. 4 is a structural diagram illustrating another apparatus for data auditing, according to an implementation of the present specification.

In addition, implementations of the present specification further provide another apparatus for data auditing, as shown in FIG. 4.

FIG. 4 is a structural diagram of an apparatus for data auditing provided by an implementation of the specification, including: a receiving module 400, configured to receive an auditing request with respect to a search result from an agent; and a sending module 402, configured to return to the agent the key used when generating the encrypted data to obtain the search result, so that the agent can decrypt, based on the key, the encrypted data generated by the apparatus for data auditing among the to-be-audited data obtained from the trusted storage space, to determine the original data of the apparatus for data auditing, and audit the apparatus for data auditing based on the determined original data.

The apparatus further includes: an evidence storing module 404, configured to receive a search request to obtain the search result, determine the original data based on the search request, and encrypt the original data based on the key to obtain encrypted data.

The evidence storing module 404 is configured to send the encrypted data to other computing nodes, so that the other computing nodes store the received encrypted data and/or the encrypted data generated by the other computing nodes as the to-be-audited data in the trusted storage space, and return the storage address of the to-be-audited data to the agent.

The apparatus for data auditing can be a participant that performs secure multi-party computations based on the search request.

Figure 5:
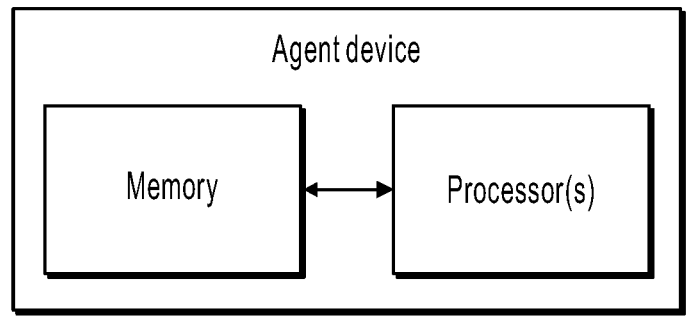
FIG. 5 is a structural diagram illustrating an agent device, according to an implementation of the present specification.

Based on the method for data auditing described in FIG. 2, an agent device is provided accordingly in the present specification, as shown in FIG. 5, including: one or more processors and memories storing a program, and the program is configured to make the one or more processors perform the following steps: receiving an auditing request with respect to a search result; for each computing node, obtaining a key used by the computing node when generating encrypted data to obtain the search result, and obtaining to-be-audited data stored by the computing node in a trusted storage space; where the to-be-audited data stored by the computing node in the trusted storage space includes: encrypted data received by the computing node from other computing nodes, and/or encrypted data generated by the computing node; decrypting the encrypted data in the to-be-audited data based on the obtained keys of the respective computing nodes, to obtain original data of the respective computing nodes; auditing each computing node based on the obtained original data.

Figure 6:
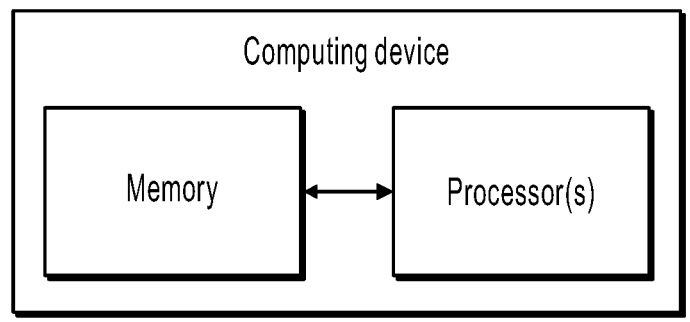
FIG. 6 is a structural diagram illustrating another computing node, according to an implementation of the present specification.

In addition, a computing node is accordingly provided in the present specification, as shown in FIG. 6, including: one or more processors and memories, where the memory stores a program, and the program is configured to make the one or more processors perform the following steps: receiving an auditing request with respect to a search result from an agent by the computing node; and returning to the agent the key used when generating the encrypted data to obtain the search result, so that the agent can decrypt, based on the key, the encrypted data generated by the computing node among the to-be-audited data obtained from the trusted storage space, to determine the original data of the computing node, and audit the computing node based on the determined original data.

It should be noted that implementations in the present specification are described in a progressive manner, references can be made to each other for the same or similar parts between the various implementations, and each implementation focuses on the differences from other implementations. In particular, with respect to the mobile terminals and servers provided in the implementations of the present specification, since they are basically similar to the method implementations, the description thereof is relatively simple. For the related parts, reference may be made to the description of the method implementations.

In the 1990s, for a technological improvement, there was a clear distinction between an improvement in hardware (for example, for the circuit structure of diodes, transistors, switches, etc.) and an improvement in software (for methods and processes). However, with the development of technology, the improvement of many methods and processes can be regarded as a direct improvement of the structure of a hardware circuit. Designers almost always obtain the corresponding hardware circuit structure by programming the improved method or process into a hardware circuit. Therefore, it is possible that an improvement of a method or a process is realized by entity modules of hardware. For example, a Programmable Logic Device (PLD) (for example, a Field Programmable Gate Array (FPGA)), is such an integrated circuit whose logic function is determined by the user programming the device. A digital system is "integrated" on a PLD through the programming of the designers, rather than a dedicated integrated circuit chip designed and produced by a chip manufacturer. Moreover, nowadays, instead of making integrated circuit chips manually, this programming is mostly implemented using "logic compiler" software, which is similar to the software compiler used in program development, and the original code before compilation must be written in a specific programming language, which is called a Hardware Description Language (HDL). There are multiple HDLs rather than one, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc., and the most commonly used currently are VHDL (Very-High-Speed Integrated Circuit Hardware Description Language) and Verilog. A person of ordinary skill in the art should also understand that by logically programming the method or process using the above-mentioned several hardware description languages and integrated it into an integrated circuit, a hardware circuit that implements such logic method or process can be easily obtained.

The controller may be implemented in any suitable manner. For example, the controller may take the form of a microprocessor or processor and a computer-readable medium, logic gates, switches, application specific integrated circuits (ASICs), programmable logic controllers, and embedded microcontrollers storing computer-readable program code (such as software or firmware) executable by the (micro) processor. Examples of the controller include, but are not limited to, the following microcontrollers: ARC 625D, Atmel AT91SAM, Microchip PIC18F26K20 and Silicone Labs C8051F320. The memory controller can also be implemented as part of the control logic for the memory. A person of ordinary skill in the art also know that, in addition to implementing the controller in pure computer-readable program codes, it is entirely possible to make the controller logic gates, switches, dedicated integrated circuits, programmable logic controllers, embedded microcontrollers and the like to achieve the same function by logically programming the method and the steps. Therefore, such a controller can be regarded as a hardware component, and apparatuses included in the controller for implementing various functions can also be regarded as structures within the hardware component. Or even, devices for implementing various functions may be regarded as both software modules implementing the method and structures within hardware component.

The system, apparatus, module, or unit illustrated in the above implementations may be implemented by using a computer chip or an entity, or by using a product having a certain function. A typical implementation device is a computer. The computer may be a personal computer, a laptop computer, a cellular phone, a camera phone, a smartphone, a personal digital assistant, a media player, a navigation device, an email device, a game console, a tablet computer, a wearable device, or any combination of these devices.

For convenience of description, when describing the above apparatus, the functions are divided into various units and described separately. Of course, when implementing the present disclosure, the functions of the units may be implemented in the same software or multiple software and/or hardware.

A person of ordinary skill in the art should understand that the implementations of the present disclosure may be provided as a method, a system, or a computer program product. Therefore, the present disclosure may take the form of an entirely hardware implementation, an entirely software implementation, or an implementation combining both software and hardware aspects. Moreover, the present disclosure may take the form of a computer program product implemented on one or more computer-usable storage media (including, but not limited to, disk memory, CD-ROM, optical memory, etc.) containing computer-usable program code.

The present disclosure is described with reference to flowcharts and/or block diagrams of methods, devices (systems), and computer program products according to implementations of the present disclosure. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, a special-purpose computer, an embedded processor, or other programmable data processing devices to produce a machine, so that through instructions executed by the processor of the computers or other programmable data processing devices, an apparatus for implementing the functions specified in one or more processes of the flowcharts and/or one or more blocks of the block diagrams is produced.

These computer program instructions may also be stored in a computer-readable memory capable of directing a computer or other programmable data processing device to work in a specific manner such that the instructions stored in the computer-readable memory produce a manufactured article including an instruction device, where the instruction device implements the functions specified in one or more processes of the flowcharts and/or one or more blocks of the block diagrams.

These computer program instructions can also be loaded onto a computer or other programmable data processing device, so that a series of steps can be performed on the computer or other programmable device to produce a computer-implemented process, and the instructions executed in the computers or other programmable data processing devices provide steps for implementing the functions specified in one or more processes of the flowcharts and/or one or more blocks of the block diagrams.

In a typical configuration, a computing device includes one or more processors (CPUs), input/output interfaces, network interfaces, and memories.

The memories may include a computer readable medium in the form of a non-permanent memory, a random access memory (RAM), and/or a non-volatile memory, such as a read only memory (ROM) or a flash memory (flash RAM). Memory is an example of the computer readable medium.

The computer readable medium includes permanent and non-permanent, removable and non-removable media that may accomplish information storage by any method or technology. Information may be computer readable instructions, data structures, modules of a program, or other data. Examples of the computer storage medium include, but are not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technologies, a compact disc read only memory (CD-ROM), a digital versatile disc (DVD) or other optical storage, a cartridge magnetic tape, a magnetic tape or disk storage or other magnetic storage devices or any other non-transmission media that may be used to store information accessible by a computing device. As defined herein, the computer readable medium does not include transitory computer readable media such as modulated data signals and carrier waves.

It should also be noted that the terms "including", "comprising" or any other variants thereof are intended to cover non-exclusive inclusion, so that a process, method, product, or device that includes a series of elements includes not only those elements, but also other elements not explicitly listed, or those that are inherent to such process, method, product, or device. Without more restrictions, elements defined by the sentence "including a . . . " do not exclude the existence of other identical elements in the process, method, product or device including the elements.

A person of ordinary skill in the art should understand that the implementations of the present disclosure may be provided as a method, a system, or a computer program product. Therefore, the present disclosure may take the form of an entirely hardware implementation, an entirely software implementation, or an implementation combining both software and hardware aspects. Moreover, the present disclosure may take the form of a computer program product implemented on one or more computer-usable storage media (including, but not limited to, disk memory, CD-ROM, optical memory, etc.) containing computer-usable program code.

This disclosure may be described in the general context of computer-executable instructions executed by a computer, such as program modules. Generally, program modules include routines, programs, objects, components, data structures, etc. that perform specific tasks or implement specific abstract data types. The present disclosure can also be practiced in distributed computing environments in which tasks are performed by remote processing devices connected through a communication network. In a distributed computing environment, program modules may be located in local and remote computer storage media, including storage devices.

It should be noted that implementations in the present specification are described in a progressive manner, references can be made to each other for the same or similar parts between the various implementations, and each implementation focuses on the differences from other implementations. In particular, with respect to the system implementations, since they are basically similar to the method implementations, the description thereof is relatively simple. For the related parts, reference may be made to the description of the method implementations.

The above are only implementations of the present disclosure and are not intended to limit the present disclosure. For those skilled in the art, this disclosure may have various modifications and changes. Any modification, equivalent replacement, and improvement made within the spirit and principle of this disclosure shall be included in the scope of claims of this disclosure.

What is claimed is:

1. A computer-implemented method for data auditing, the method comprising:
receiving, by one or more processors a search request to obtain encrypted data associated with a user, the encrypted data being stored by a plurality of computing nodes of a blockchain network;
receiving, by the one or more processors and from the plurality of computing nodes of the blockchain network, the encrypted data associated with the user;
processing, by the one or more processors, the encrypted data of each of the plurality of computing nodes of the blockchain network using a secure multi-party algorithm based on oblivious transfer of original data associated to the user to determine a search result comprising a serial number, wherein the secure multi-party algorithm is configured to reveal a numerical value corresponding to the original data without revealing privacy data of any of the plurality of computing nodes of the blockchain network;

receiving, by the one or more processors, an auditing request corresponding to the serial number of the search result, wherein the auditing request comprises an identity information;

determining, by the one or more processors, that an auditing process is permitted based on the identity information, wherein the identity information indicates that the auditing process is targeting to-be-audited data corresponding to the user;

in response to determining that the auditing process is permitted, obtaining, by the one or more processors, keys used to decrypt the encrypted data;

retrieving, by the one or more processors, to-be-audited data, wherein the to-be-audited data comprises the encrypted data and respective identifier of each of the plurality of computing nodes corresponding to the encrypted data associated with the user, wherein the respective identifier of the each of the plurality of computing nodes corresponding to the encrypted data is the respective identifier of a respective computing node of the plurality of computing nodes that generated the encrypted data;

decrypting, by the one or more processors, based on the keys, the encrypted data to determine at least a portion of original data corresponding to the to-be-audited data; and auditing, by the one or more processors, the to-be-audited data based on the at least the portion of the original data.

2. The computer-implemented method of claim 1, wherein the encrypted data generated by a first computing node of the plurality of computing nodes is sent to a second computing node of the plurality of computing nodes to execute the secure multi-party algorithm.

3. The computer-implemented method of claim 1, further comprising:
receiving a storage address corresponding to a serial number of the search result returned by a respective computing node; and
establishing and storing a corresponding relationship between the storage address and the serial number.

4. The computer-implemented method of claim 3, wherein the auditing request comprises the serial number of the search result.

5. The computer-implemented method of claim 4, further comprising:
determining the storage address corresponding to the serial number carried in the auditing request according to the corresponding relationship between stored serial numbers and storage addresses; and
determining the to-be-audited data from a trusted storage space according to the storage address.

6. The computer-implemented method of claim 1, wherein the respective identifier indicates a computing node of the plurality of computing nodes that generated the encrypted data.

7. The computer-implemented method of claim 6, wherein decrypting comprises:
determining, based on the respective identifier of a corresponding computing node of the plurality of computing nodes, a portion of the encrypted data generated by the corresponding computing node from the to-be-audited data; and
decrypting, based on a key of the corresponding computing node, the portion of the encrypted data.

8. A non-transitory, computer-readable medium storing one or more instructions that when executed by one or more processors of a computer system perform one or more operations for data auditing, the operations comprising:
receiving a search request to obtain encrypted data associated with a user, the encrypted data being stored by a plurality of computing nodes of a blockchain network;
receiving, from the plurality of computing nodes of the blockchain network, the encrypted data associated with the user;
processing the encrypted data of each of the plurality of computing nodes of the blockchain network using a secure multi-party algorithm based on oblivious transfer of original data associated to the user to determine a search result comprising a serial number, wherein the secure multi-party algorithm is configured to reveal a numerical value corresponding to the original data without revealing privacy data of any of the plurality of computing nodes of the blockchain network;
receiving an auditing request corresponding to the serial number of the search result, wherein the auditing request comprises an identity information;
determining that an auditing process is permitted based on the identity information, wherein the identity information indicates that the auditing process is targeting to-be-audited data corresponding to the user;
in response to determining that the auditing process is permitted, obtaining keys used to decrypt the encrypted data;
retrieving to-be-audited data, wherein the to-be-audited data comprises the encrypted data and respective identifier of each of the plurality of computing nodes corresponding to the encrypted data associated with the user, wherein the respective identifier of the each of the plurality of computing nodes corresponding to the encrypted data is the respective identifier of a respective computing node of the plurality of computing nodes that generated the encrypted data;
decrypting based on the keys, the encrypted data to determine at least a portion of original data corresponding to the to-be-audited data; and
auditing the to-be-audited data based on the at least the portion of the original data.

9. The non-transitory, computer-readable medium of claim 8, wherein the encrypted data generated by a first computing node of the plurality of computing nodes is sent to a second computing node of the plurality of computing nodes to execute the secure multi-party algorithm.

10. The non-transitory, computer-readable medium of claim 8, wherein the one or more operations further comprise:
receiving a storage address corresponding to a serial number of the search result returned by a respective computing node; and
establishing and storing a corresponding relationship between the storage address and the serial number.

11. The non-transitory, computer-readable medium of claim 10, wherein the auditing request comprises the serial number of the search result.

12. The non-transitory, computer-readable medium of claim 11, wherein the one or more operations further comprise:

determining the storage address corresponding to the serial number carried in the auditing request according to the corresponding relationship between stored serial numbers and storage addresses; and determining the to-be-audited data from a trusted storage space according to the storage address.

13. The non-transitory, computer-readable medium of claim 8, wherein the respective identifier indicates a computing node of the plurality of computing nodes that generated the encrypted data.

14. The non-transitory, computer-readable medium of claim 13, wherein decrypting comprises:

determining, based on the respective identifier of a corresponding computing node of the plurality of computing nodes, a portion of the encrypted data generated by the corresponding computing node from the to-be-audited data; and decrypting, based on a key of the corresponding computing node, the portion of the encrypted data.

15. A computer-implemented system, comprising:

one or more computers; and one or more computer memory devices interoperably coupled with the one or more computers and having tangible, non-transitory, machine-readable media storing one or more instructions that, when executed by one or more processors of the one or more computers, perform one or more operations for data auditing, the operations comprising:

receiving a search request to obtain encrypted data associated with a user, the encrypted data being stored by a plurality of computing nodes of a blockchain network;

receiving, from the plurality of computing nodes of the blockchain network, the encrypted data associated with the user;

processing the encrypted data of each of the plurality of computing nodes of the blockchain network using a secure multi-party algorithm based on oblivious transfer of original data associated to the user to determine a search result comprising a serial number, wherein the secure multi-party algorithm is configured to reveal a numerical value corresponding to the original data without revealing privacy data of any of the plurality of computing nodes of the blockchain network;

receiving an auditing request corresponding to the serial number of the search result, wherein the auditing request comprises an identity information;

determining that an auditing process is permitted based on the identity information, wherein the identity information indicates that the auditing process is targeting to-be-audited data corresponding to the user;

in response to determining that the auditing process is permitted, obtaining keys used to decrypt the encrypted data;

retrieving to-be-audited data, wherein the to-be-audited data comprises the encrypted data and respective identifier of each of the plurality of computing nodes corresponding to the encrypted data associated with the user, wherein the respective identifier of the each of the plurality of computing nodes corresponding to the encrypted data is the respective identifier of a respective computing node of the plurality of computing nodes that generated the encrypted data;

decrypting based on the keys, the encrypted data to determine at least a portion of original data corresponding to the to-be-audited data; and auditing the to-be-audited data based on the at least the portion of the original data.

16. The computer-implemented system of claim 15, wherein the encrypted data generated by a first computing node of the plurality of computing nodes is sent to a second computing node of the plurality of computing nodes to execute the secure multi-party algorithm.

17. The computer-implemented system of claim 15, wherein the one or more operations further comprise:

receiving a storage address corresponding to a serial number of the search result returned by a respective computing node; and establishing and storing a corresponding relationship between the storage address and the serial number.

18. The computer-implemented system of claim 17, wherein the auditing request comprises the serial number of the search result.

19. The computer-implemented system of claim 18, wherein the one or more operations further comprise:

determining the storage address corresponding to the serial number carried in the auditing request according to the corresponding relationship between stored serial numbers and storage addresses; and determining the to-be-audited data from a trusted storage space according to the storage address.

20. The computer-implemented system of claim 15, wherein the respective identifier indicates a computing node of the plurality of computing nodes that generated the encrypted data and decrypting comprises:

determining, based on the respective identifier of a corresponding computing node of the plurality of computing nodes, a portion of the encrypted data generated by the corresponding computing node from the to-be-audited data; and decrypting, based on a key of the corresponding computing node, the portion of the encrypted data.

* * * * *